United States Patent [19]
Josephson

[11] 3,974,781
[45] Aug. 17, 1976

[54] BAFFLED BULK SHIPMENT OF LADING IN CONVERTIBLE RAILWAY CARS

[75] Inventor: Edgar F. Josephson, St. Charles, Mo.

[73] Assignee: ACF Industries, Incorporated, New York, N.Y.

[22] Filed: Mar. 6, 1975

[21] Appl. No.: 556,039

Related U.S. Application Data

[62] Division of Ser. No. 411,364, Oct. 31, 1973, Pat. No. 3,899,981.

[52] U.S. Cl. ............................. 105/243; 105/375; 214/82
[51] Int. Cl.² ........................................ B60D 1/56
[58] Field of Search .......... 105/243, 239, 375, 247; 34/22, 46; 62/133; 98/464; 214/16 R, 83.28, 82; 220/1, 5, 22; 296/3–5

[56] References Cited
UNITED STATES PATENTS

| 2,180,502 | 11/1939 | Bonsall | 105/375 |
| 3,738,511 | 6/1973 | Lemon et al. | 105/243 |

FOREIGN PATENTS OR APPLICATIONS

| 437,516 | 11/1926 | Germany | 105/243 |

Primary Examiner—M. H. Wood, Jr.
Assistant Examiner—Richard A. Bertsch
Attorney, Agent, or Firm—Henry W. Cummings

[57] ABSTRACT

Baffles are provided in insulated convertible hopper-box cars to allow bulk shipment of perishable lading, which is not capable of supporting more than several feet without the upper lading portion damaging the lower lading portion due to the weight of the upper portion. For example, citrus fruits may thus be transported in such baffled convertible railway cars.

19 Claims, 13 Drawing Figures

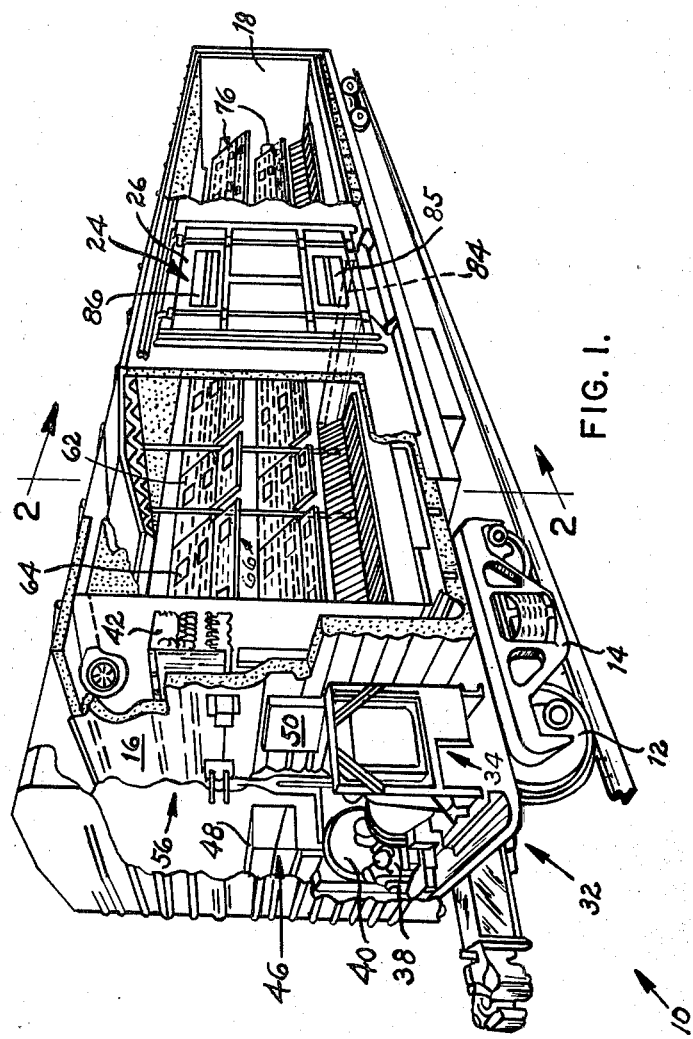
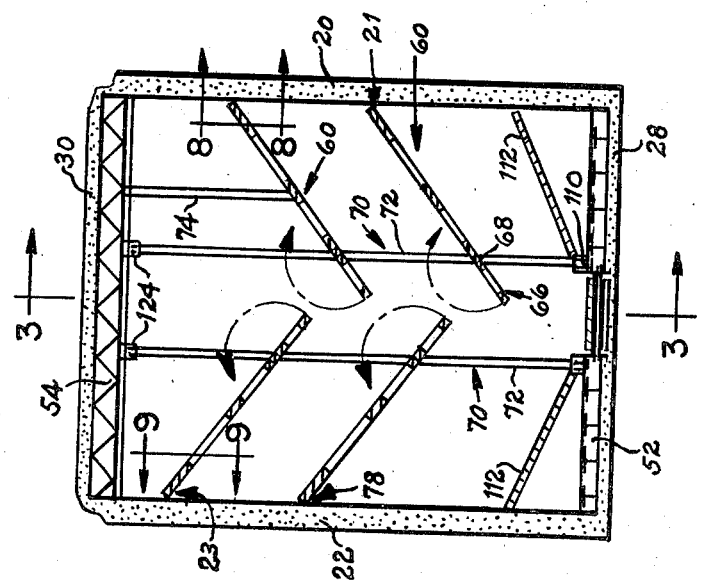

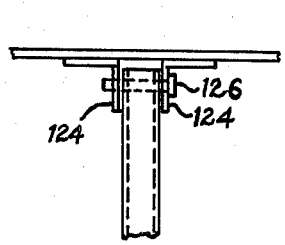
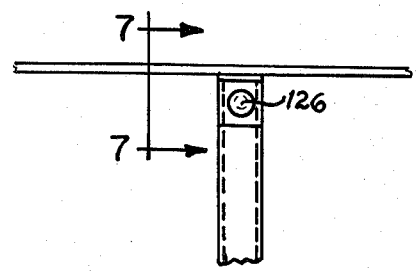
FIG. 7.
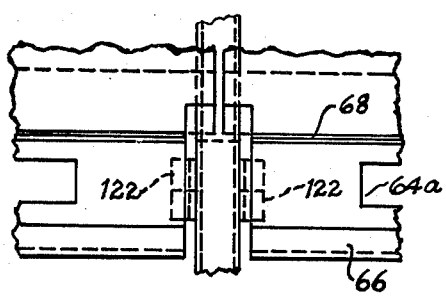
FIG. 5.
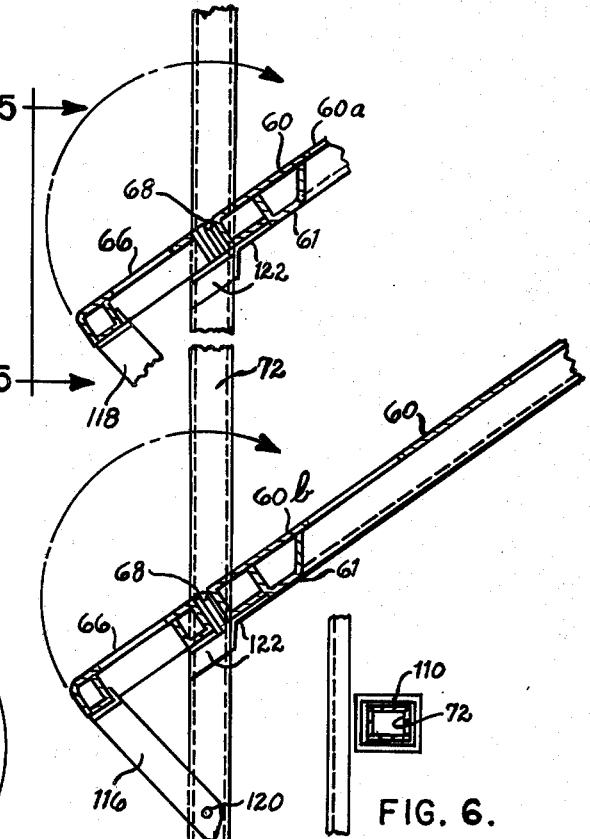
FIG. 6.
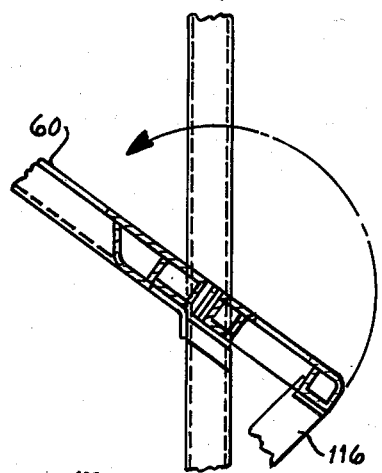
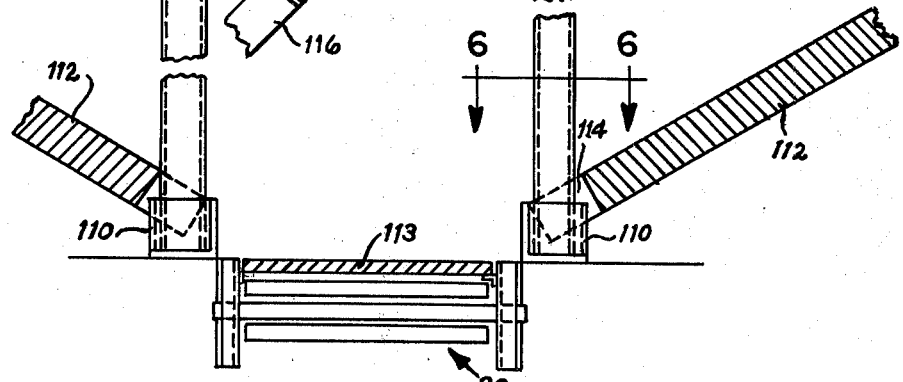
FIG. 4.

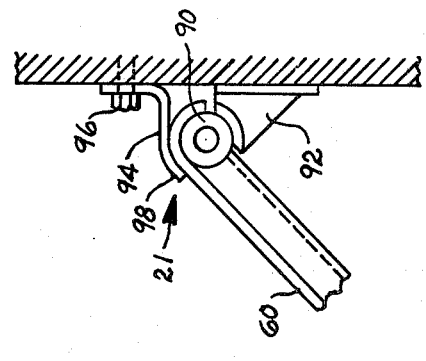
FIG. 8.
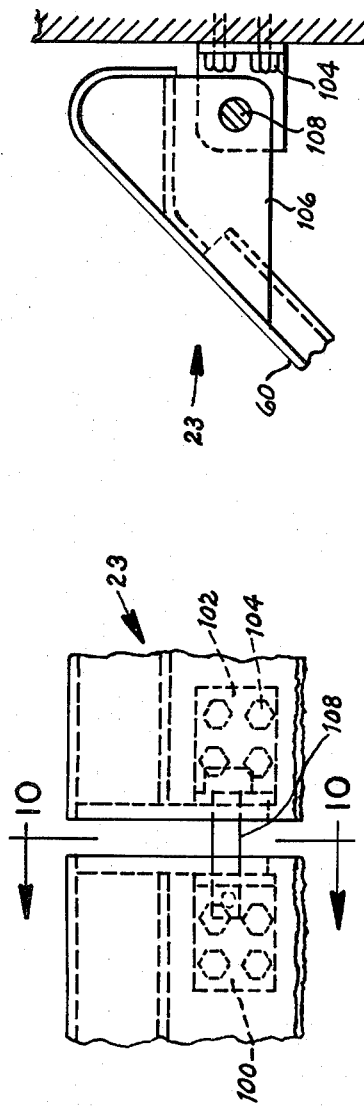
FIG. 10.
FIG. 9.
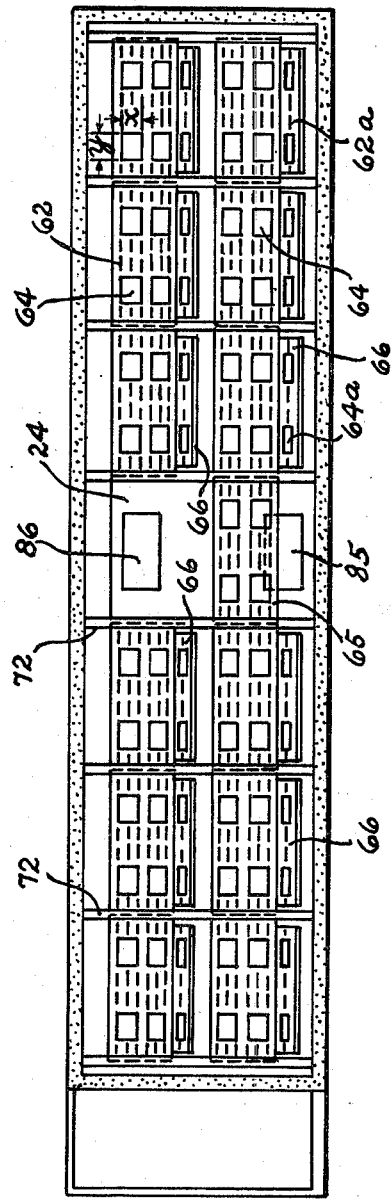
FIG. 3.

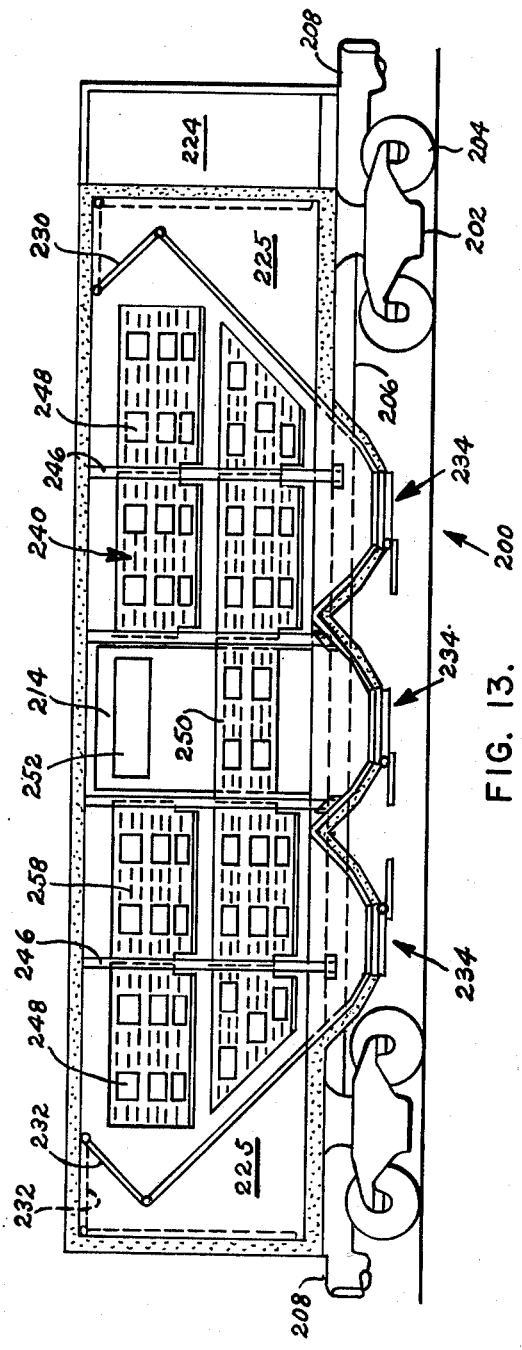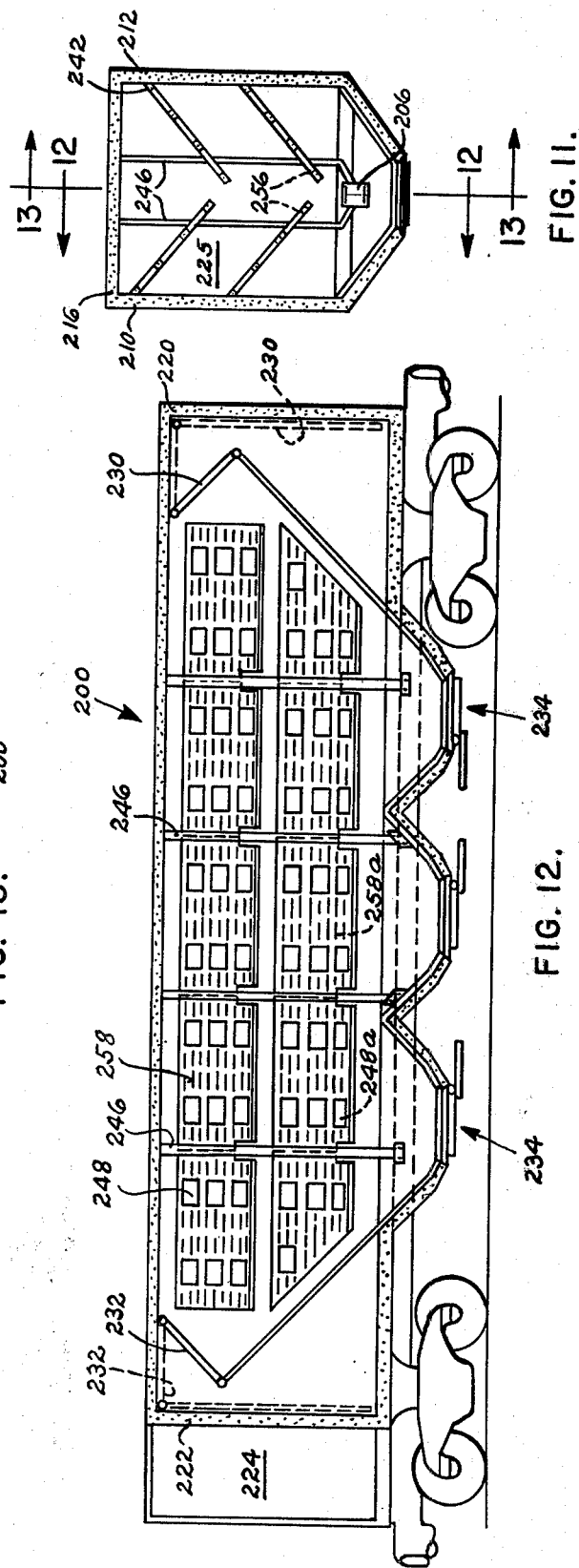

BAFFLED BULK SHIPMENT OF LADING IN CONVERTIBLE RAILWAY CARS

This application is a division of application Ser. No. 411,364, filed Oct. 31, 1973, now U.S. Pat. No. 3,899,981, issued Aug. 19, 1975.

BACKGROUND OF THE INVENTION

Refrigerator cars with floor conveyers are presently used by the railroads to carry relatively rugged perishable lading, for example, potatoes in bulk. Many of the cars have both longitudinal conveyers which feed to the center of the car, and a transverse conveyer which feed out the side door. See, for example, AAR Designation RSB & RPB type cars. Many of these cars presently have side racks which slope to the center and sections of racks which cover the longitudinal conveyer.

When the cars are loaded the racks are all in place. A telescopic loading conveyer loads the car from the ends toward the center. The large side door is closed and the center section is loaded through a small door in the top center of the main door.

Unloading is accomplished by connecting a power source to a drive shaft extension which operates the longitudinal and transverse conveyers in the car. Track side conveyers are connected to the small unloading door in the main side door. The product in the center section is unloaded first, and when empty, the main side door is then opened. An operator then removes the first section of floor rack exposing a part of the longitudinal conveyer. Product not sliding off the side sloped rack is manually moved to the conveyer. The operator progresses down to the end of the car, removing succeeding sections of the floor rack. When the car has been emptied the side and floor racks can be leveled and the car can be used as a refrigerated or nonrefrigerated box car.

U.S. Pat. No. 3,738,511 discloses a railway car which is convertible from an insulated box car to a box car having hoppers for the transport of bulk cargo.

SUMMARY OF THE INVENTION

In accordance with the present invention baffles are provided in insulated refrigerator cars, and/or refrigerator cars, and/or convertible hopper-box cars to enable such cars to transport in bulk, lading which is not capable of supporting more than several feet without the upper lading portion damaging the lower lading portion due to the weight of the upper portion. For example, citrus fruits may thus be transported in such baffled cars. The baffles preferably have an angle to the horizontal between about 30° and 50°. More than one level of baffles may be provided. The baffles preferably have holes therein for the product to flow through to facilitate loading; and may also have holes or slots to allow conditioned air to flow through the product in the event an air conditioning system is used. The baffles may be fixed in place or can be removable or hinged to lay against the side walls to allow periods of use of the car as a box car.

THE DRAWINGS

FIG. 1 is a schematic perspective view of an insulated box car having incorporated therein baffles in accordance with the present invention;

FIG. 2 is a sectional view along the line 2—2 of FIG. 1;

FIG. 3 is a section a view along the line 3—3 in FIG. 2;

FIG. 4 is an enlarged view of a portion of FIG. 3 illustrating the longitudinal floor converyer and posts which support baffles and floor racks;

FIG. 5 is a view along the line 5—5 in FIG. 4;
FIG. 6 is a view along the line 6—6 in FIG. 4;
FIG. 7 is a view along the line 7—7 in FIG. 4;
FIG. 8 is a view along the line 8—8 in FIG. 2;
FIG. 9 is a view along the line 9—9 in FIG. 2;
FIG. 10 is a view along the line 10—10 in FIG. 9;
FIG. 11 is a cross-sectional view along the line 11—11 in FIG. 12 of a convertible hopper-box car having baffles in accordance with the present invention;
FIG. 12 is a view along the line 12—12 in FIG. 11; and
FIG. 13 is a view along the line 13—13 in FIG. 11.

DETAILED DESCRIPTION

An insulated box car is indicated in FIG. 1 generally at 10. The car comprises conventional wheels 12 and a truck of conventional design 14.

The car is provided according to known construction with insulated ends 16 and 18 and insulated sides 20 and 22. Doors of known construction may be provided on one or both sides of the car as indicated generally at 24. For example, a plug door 26 may be utilized. An insulating floor 28 and an insulating roof structure 30 of known construction are also provided.

If the insulated car is a refrigerator car, at one end of the car an air conditioning system indicated generally at 32 is provided. As is known in the art this air conditioning system preferably comprises a power source 34, for example, a diesel engine which is used to power the air conditioning system. The air conditioning system is of known construction and generally comprises a refrigeration compressor 38, a condenser 40 and an evaporator 42. A starting unit for the refrigeration system is provided indicated generally at 46 including a battery 48. Appropriate controls for the refrigeration system are indicated generally at 50.

The car may be provided with a floor air plenum 52 and a ceiling air plenum 54. The refrigeration system passes conditioned air into the roof air plenum through appropriate passageways and/or conduits. The conditioned air passes downward throughout the car to cool and dehumidify the lading and is gathered up in the floor air plenum. The conditioned air then returns to the refrigeration system through appropriate passageways and/or conduits laden with moisture and/or a temperature increase picked up from the lading. If desired, the air conditioning system may also have a heating means 56 which also may be powered by diesel engine 36. In this event the conditioned air will be heated air. However, the cycle is otherwise the same. The heated air may perform some dehumidifying function. Also, for certain ladings, it may be necessary to add water vapor to the conditioned air and such a procedure is within the scope of the present invention. Obviously, if desired, the conditioned air may be passed first into the floor air plenum and up through the lading to the ceiling plenum and then back to the air conditioning system or first into the ceiling air plenum and then downwardly through the side walls and end walls, to provide envelope cooling, and into the floor plenum and then back to the air conditioning system.

In accordance with the present invention at least one layer of baffles indicated generally at 60 is provided in the car. Baffles 60 may have any desired cross section, such as rectangular or channel shape, and may be provided with reinforcing members 61 (FIG. 4). The baffles are preferably affixed to the sides and/or ends of the car with appropriate hinges or anchors indicated generally at 21. If it is desired that the baffles remain permanently in place, suitable anchors may be utilized, an example of which is shown in FIG. 8. Baffles 60 are affixed to longitudinally extending tubing 90, for example, by welding. Tubing 90 is held in place by gussets 92 mounted on the car sides with fasteners or welding, and by a retainer 94 which is held in place with fasteners 96 and which retainer 94 has a portion 98 which engages the baffles. The baffles can be removed by unfastening fasteners 96. Other anchor arrangements for baffles 60 will be apparent to those skilled in the art.

If it is desired to move the baffles to a stored position adjacent the sides of the car, suitable hinges 23 are provided which, for example, may be constructed as shown in FIG. 9 and 10. Hinges 23 may comprise, brackets 100 and 102 mounted upon the car sides with appropriate fasteners 104. Affixed to baffles 60 are nose members 106 which may have any suitable shape, for example, triangular through which pass pin members 108 to allow the baffles to pivot thereabout. Other appropriate hinge mounting arrangements for baffles 60 will be apparent to those skilled in the art.

The baffles are preferably provided at an angle of from about 30° to about 50° with respect to the horizontal. This range represents a balance between a totally vertical position which facilitates loading of the car, and a totally horizontal position which maximizes lading support. In this regard attention is directed to the application of Coyle and Josephson, Ser. No. 411,379, filed 10/31/1973, assigned to the same assignee as the present application and filed on even date herewith which contains a detailed discussion of the balancing of the factors regarding the baffle angle. In this regard it is to be noted that the angle of repose of the particular lading to be transported may be considered in determining the particular angle within this range which is to be used for particular service. The entire disclosure of the said Coyle and Josephson application is hereby incorporated in the present application by reference.

The baffles are preferably provided with openings 64 to facilitate loading of the car. The openings 64 preferably have X and Y dimensions between 8 and 12 inches (FIG. 3).

Furthermore, openings 62 are preferably provided in the baffles to facilitate circulation of conditioned air therethrough (FIG. 1). Preferably the small dimension of these openings is not greater than about ½ inch. If the size is much greater than this, the produce sits on the openings and may be damaged thereby, and/or block the flow of air in the car.

Two levels of baffles have been illustrated in the drawings. It will be apparent to those skilled in the art that the number of levels may vary as desired depending upon the particular lading, how full it is desired to fill the car, and the extend to which the upper portion of the lading damages lower portion of the lading due to weight.

For some applications, it may be desirable to provide doors in some or all of the baffles as indicated generally at 66. The doors are appropriately hinged to the baffles at 68. The doors also may be provided with openings to facilitate loading 64a, preferably of X and Y dimensions of 3–12 inches and may be provided with smaller openings 62a to facilitate the flow of conditioned air in the car, also preferably having a maximum smallest dimension of about ½ inch.

Supports for the baffles are also preferably provided as indicated generally at 70. These supports may comprise support members 72 affixed to the floor portion by means of appropriate fasteners or welding (not shown). If desired, supports may also be suspended either from the ceiling portion as indicated at 74 or from the ends of the car as indicated at 76, and/or from the sides as indicated at 78.

A specific example of a baffle support arrangement is shown in FIGS. 4 through 7. Support members or posts 72 are provided with pockets 110 mounted upon the car floor. Floor racks 112 normally used in refrigerated cars may be provided with cutouts 114 to accommodate supports 72 and pockets 110. Clip support members 122 may be affixed to posts, for example, by welding or with appropriate fasteners. Clips 122, for instance, may have an angle shape which engages baffles 60. Furthermore, brace members 116 and 118 are preferably provided on the posts 72, for example, by means of pins 120. Braces 116 and 118 engage a portion of baffles 60. As illustrated the braces engage doors 66 but the braces may engage the main portion of the baffles, if desired.

It will be apparent that posts 72 are removably affixed to the roof of the car, for example, by means of brackets 124 and pin-type fasteners 126.

Assuming that it is desired to remove the posts and place the baffles at the side of the car for transporting a non-perishable lading, doors 66 are first pivoted about hinge points 68 to fold the same upon the main baffle portions 60. In so doing braces 116 automatically pivot about pins 120 and assume a vertical position along posts 72. Next pin fasteners 126 are removed and posts 72 are moved inwardly a sufficient amount to disengage clips 122 from upper baffles 60a in FIG. 4. At this point the upper baffles will automatically fall into place along the side of the car. Further, inward movement of posts 72 will cause a similar movement of lower baffles 60b. Then posts 72 may be removed from pocket 110 and from the car, or if desired posts 72 may be replaced in the car and a lading transported with the posts in place.

One way of loading the insulated box or refrigerator car is as follows:

The hinged doors 66 located over the floor and/or covered floor conveyer 82 are opened. A loading telescopic conveyer is extended into the car and to the proximity of the end of the car. The loading of the product begins near the floor. As the product pile rises the door 66 are closed and the conveyer is raised above the top baffle. The product coming off the telescopic conveyer rolls down the pile, through openings 64 and 64a provided in the baffles and fills the space beneath the baffles. The loading progresses to the center of the car. The other end of the car is similarly loaded. A lower baffle section 65 is then placed across the door opening. The main door 24 is then closed. The center is then loaded through an upper door 86 provided in main door 24.

For unloading the car, conveyers are preferably provided in the floor portion of the car. For example, a generally longitudinally extending conveyer 82 may be provided. Furthermore, or alternatively, a transversely extending conveyer 84 may be provided which operates in connection with door 24. Also, a lower unloading door 85 may be provided in the door 24.

Unloading may be done as follows:

A drive motor is connected to the car drive shaft extension which operates the conveyers in the car. A track side conveyer is connected to the lower unloading door 85 in the main door 24. Door 85 is opened. The transverse unloading conveyer 84 unloads the product in the center section, discharging into the track side conveyer.

When the center section is empty the main side door 24 is opened. The track side conveyer is connected to the end of the car longitudinal conveyer 82. The baffle section in the open doorway is removed. An operator then removes the first section of floor rack 113 exposing part of the longitudinal conveyer. Product not sliding off the baffles 60 or side sloped racks 112 is manually moved to the conveyer. The doors in the baffles are opened to provide access to the next section of floor rack 113 covering the conveyer 82. The operator progresses down to the end of the car removing succeeding sections of the floor rack.

When both ends of the car have been emptied and all product removed, the floor racks can be replaced, the equipment disconnected and the car returned for another load.

Alternatively, the floor racks can be leveled, and the baffles can be removed or made to lay along the side walls. The baffle supports may be stored under the floor rack or removed. The car can then be used as a box car, either refrigerated or not refrigerated, for transport of another lading.

If an insulated box car is used which does not have longitudinal and/or transverse unloading conveyers, it is preferred to close the door(s) on one side of the car and provide a supplementary loading door in the upper portion of door on the remaining side. The car is then loaded as described above by means of a track side conveyer. The final loading is carried out through the supplementary loading door.

Unloading is carried out by means of a track side unloading conveyer. The main door is opened partially and the lading removed by means of a catching arrangement which is integral with the track side conveyer. The ends of the car are also unloaded by moving the product to the center of the car and into a track side conveyer.

Another embodiment of the present invention is shown in FIGS. 11–13. A convertible railway hopper car is shown and described in U.S. Pat. No. 3,738,511 which is hereby incorporated into the present application by reference.

This car is indicated generally in the drawings of the present application at 200. The car comprises conventional trucks 202 having wheels 204 associated therewith. The trucks 202 support a through center sill 206. Conventional couplers 208 are provided at opposite ends of the car. The car is provided with spaced apart insulated sides 210 and 212, one of which is provided with a door 214. An insulated roof 216 is also provided. Insulated end portions 220 and 222 are provided and an air conditioning compartment 224 is provided at one end. Air conditioning compartment 224 preferably contains a refrigeration and dehumidifying and/or an air heating unit of known construction as described hereinabove regarding FIGS. 1–10.

Movable slope sheets 230 and 232 are provided within the insulated compartment 225 of the car to define in one position slope sheets. In another position the slope shets are stored as indicated dotted in FIGS. 12 and 13 to provide a conventional box or refrigerator car. Conventional hopper outlets 234 may be provided to unload the car when sheets 230 and 232 are used to define slope sheets. For a further explanation and details of the construction of this car, reference is made to the previously mentioned '511 patent.

Baffles indicated generally at 240 may be added to this car to reduce the weight that upper bulk lading would normally exert upon the lower lading in the absence of baffles. As shown in FIGS. 11–13, one or more levels may be provided as desired. The baffles may be hinged at 242 or otherwise attached to the side walls. Removable center supports 246 or posts may also be provided. The center supports may be attached to center sill 206 and roof 216.

Loading the car for bulk lading transport may be done as follows:

The movable end slope sheets 230 and 232 are moved forward to form hopper slope sheets as shown in FIGS. 12 and 13 before loading the car. This is in contrast to the operation described in the patent specification and is to avoid damaging the lading by forcing the lading against the baffles by moving the slope sheets forward after the car is fully loaded. Alternatively, the car could be light loaded at the ends and the slope sheets moved forward to facilitate unloading as described in the patent.

A telescopic conveyer is placed in the center door 214 above the top level of baffles and is extended toward the end slope sheet. The product coming off the conveyer slides down the slope sheet and develops a pile up to the conveyer. Product flows through the openings 248 provided in the baffles to provide filling of the area beneath the baffles. The other end is similarly loaded. A detachable baffle section 250 may be placed in front of the doorway. The side door 214 is closed and the center section is loaded through the upper loading door 252 in the center door.

Unloading is accomplished by connecting a conveyer beneath outlet gates 234 and the car is unloaded in a conventional manner through outlets 234. The product will largely unload by gravity.

It will be apparent that the baffles to be utilized in the convertible car are similar to the baffles to be utilized in the insulated box car and refrigerated cars described hereinabove. In addition to having loading openings therein 248, preferably having X and Y dimensions between 8 and 12 inches. Openings or slots 258 may be provided in the baffles to facilitate the circulation of conditioned air, preferably the smallest dimension of the openings 258 does not exceed about ½ inch as described hereinabove. The baffles may, if desired, be provided with doors 256 to facilitate loading of the car although it is believed for many applications doors will not be required. If used, the doors may be provided with loading openings 248a and with air circulation openings 258a. The baffles may be mounted upon the car sides, for example, in accordance with the arrangement shown in FIGS. 9 and 10 and support members or posts 246 can support the baffles in a manner similar to that shown in FIGS. 4 through 7 of the present application.

What is claimed is:

1. A convertible hopper-box railway car for transmitting perishable lading comprising:
generally vertically extending spaced apart railway car sides having insulation provided thereon at least through a substantial portion of the vertical extent; generally spaced apart railway car end sections joined to said car sides, said end sections having insulation provided on at least a substantial portion of the vertical extent; an insulated roof joining said sides and ends; movable end slope sheets mounted at opposite ends of a bulk lading carrying compartment; said slope sheets being movable from a stored position to an operative position to engage at least a portion of bulk lading and facilitate the unloading thereof through at least one hopper outlet mounted in communication with at least one floor opening in said car; and baffle supports mounting a plurality of baffles in said car adapted to reduce the weight that the upper lading would normally exert upon the lower lading in the absence of said baffles, at least one of said baffle supports affixed to at least one of said car sides.

2. A convertible car according to claim 1 wherein said baffles are removably mounted in said convertible car.

3. A convertible car according to claim 1 wherein said baffle supports are hingedly mounted in said convertible car and are movable to a stored position adjacent one of said box car sides when not in use.

4. A convertible car according to claim 1 wherein said baffles make an angle within the range of about 30° to 50° with respect to the horizontal.

5. A convertible car according to claim 1 wherein lading openings are provided in said baffles to facilitate loading of the car.

6. A convertible car according to claim 1 wherein at least some of said supports are affixed to the floor of the car.

7. A convertible car according to claim 6 wherein at least some of said supports are affixed to the roof.

8. A convertible car according to claim 6 wherein at least some of said supports are affixed to the car sides.

9. A convertible car according to claim 6 wherein at least some of said supports are affixed to the car ends.

10. A convertible car according to claim 1 wherein more than one layer of baffles is provided in said car.

11. A convertible car according to claim 1 wherein said car is provided with an air conditioning system and means are provided for passing conditioned air through said car.

12. A convertible car according to claim 11, wherein conditioned air openings are provided in said baffles to facilitate the movement of conditioned air through the car.

13. A convertible car according to claim 12 wherein the size of the largest dimension of said conditioned air openings is not greater than about ½ inch.

14. A convertible car according to claim 1 wherein at least some of said supports are affixed to a center sill passing through the longitudinal center of said convertible car.

15. A convertible car according to claim 1 wherein a plurality of hopper outlets are provided to unload said bulk lading.

16. A convertible car according to claim 1 wherein at least some of said baffles are provided with doors affixed to the lower portion of said baffles.

17. A convertible car according to claim 16 wherein at least some of said doors are provided with openings to facilitate loading said car.

18. A convertible car according to claim 1 wherein at least some of said supports are provided with clips for supporting said baffles.

19. A convertible car according to claim 18 wherein at least some of said supports are provided with braces which engage said doors.

* * * * *